(12) United States Patent
Heer

(10) Patent No.: US 8,109,465 B1
(45) Date of Patent: Feb. 7, 2012

(54) ELECTRO-MAGNETIC UP-LOCK FOR RETRACTABLE LANDING GEAR

(75) Inventor: David Jon Heer, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 866 days.

(21) Appl. No.: 12/220,401

(22) Filed: Jul. 24, 2008

Related U.S. Application Data

(60) Provisional application No. 60/963,119, filed on Aug. 2, 2007.

(51) Int. Cl.
*B64C 25/10* (2006.01)
*B64C 25/26* (2006.01)

(52) U.S. Cl. .................................................. 244/102 R

(58) Field of Classification Search .............. 244/102 R, 244/102 A, 102 SL, 102 SS
See application file for complete search history.

(56) References Cited

U.S. PATENT DOCUMENTS

| | | | |
|---|---|---|---|
| 3,647,165 A | 3/1972 | Whitla | |
| 5,233,708 A | 8/1993 | Winston | |
| 5,257,581 A * | 11/1993 | Welling | 109/24 |
| 5,288,037 A | 2/1994 | Derrien | |
| 5,441,218 A | 8/1995 | Mueller et al. | |
| 6,059,228 A | 5/2000 | Koizumi et al. | |
| 2003/0164421 A1 | 9/2003 | Collet et al. | |
| 2003/0164422 A1 | 9/2003 | Collet et al. | |

FOREIGN PATENT DOCUMENTS

SU 782819 B * 11/1980

* cited by examiner

*Primary Examiner* — Tien Dinh
*Assistant Examiner* — Richard R Green
(74) *Attorney, Agent, or Firm* — Robert O. Blinn

(57) ABSTRACT

An electro-magnetic landing gear up-lock includes at least one electro-magnet mounted to the aircraft structure positioned adjacent the landing gear trunion. When the at least one electro-magnet is energized, magnetically responsive material in the landing gear positioned adjacent to the electro-magnet is attracted to the electro-magnet with sufficient force to hold the landing gear in a retracted. De-energizing the electro-magnet causes the electro-magnet to release the landing gear to allow the landing gear to extend.

9 Claims, 6 Drawing Sheets

ELECTRO-MAGNETIC UP-LOCK FOR RETRACTABLE LANDING GEAR

CROSS REFERENCES TO RELATED APPLICATIONS

This application claims the benefit of U.S. Provisional patent application No. 60/963,119 filed Aug. 2, 2007, which is incorporated herein by reference.

FIELD OF THE INVENTION

The present invention relates to aircraft with a retractable landing gear and more particularly to a landing gear up-lock system which employs at least one electro-magnet for retaining the landing gear in a fully retracted position.

BACKGROUND OF THE INVENTION

In a conventional retractable landing gear assembly the gear retracts into the wheel well after takeoff or extends to a down and locked position prior to landing. The extension and retraction force is provided by a double acting hydraulic actuator connected between the movable trunion and fixed aircraft structure. Once the landing gear is in a retracted position, a mechanical up-lock hook is automatically engaged and hydraulic power is subsequently removed from the hydraulic actuator by a position sensing and control system. In order to extend the landing gear, hydraulic power is sequenced to first disengage the mechanical up-lock device. When the up-lock device is fully disengaged, hydraulic power is then directed to the double acting hydraulic actuator to extend the landing gear to a down and locked position. Once the landing gear achieves a down and locked position, a position sensing and control system removes hydraulic power from the double acting hydraulic actuator.

In the event of a failure in the normal gear extension system, a redundant means of extending the landing gear must be provided. This may consist of a purely mechanical system consisting of cables, pulleys, and brackets that connect the mechanical up-lock hook to a manual handle in the cockpit. Significant manual input force may be required to manually release the landing gear up-lock. This activity increases the flight crew's workload during critical phases of flight.

A disadvantage inherent in existing mechanical landing gear up-lock systems is that the various linkages and components of a mechanical system must be installed and properly adjusted such that the desired release of the landing gear prior to landing gear extension actually occurs. In some cases, because of improper adjustment or installation, the above described up-lock hook has failed to disengage rendering it impossible to extend landing gear for a landing. Such a landing gear extension failure is an extremely disruptive event that results in significant danger to passengers and crew and at best, significant damage to the aircraft as a gear-up landing is executed. What is needed is a simpler landing gear up-lock system that also reduces flight crew workload in the event that the normal extension system has failed. A simpler landing gear up-lock system would also reduce the time required to install the system and reduce the maintenance activity required to inspect and maintain the mechanical backup system.

SUMMARY OF THE INVENTION

The above described need is met by an electro-magnetic landing gear up-lock for retractable landing gear. The electro-magnetic landing gear up-lock may include at least one electro-magnet and preferably includes two electro-magnets mounted to the aircraft structure positioned adjacent to the landing gear trunion. When the electro-magnets are energized using switched aircraft electrical bus power, magnetically responsive material in the landing gear positioned adjacent to the electro-magnets is attracted to the electro-magnets with sufficient force to hold the landing gear in a retracted position. De-energizing the electro-magnets causes the electro-magnets to release the landing gear to allow the landing gear to extend.

DETAILED DESCRIPTION

Figure 1:
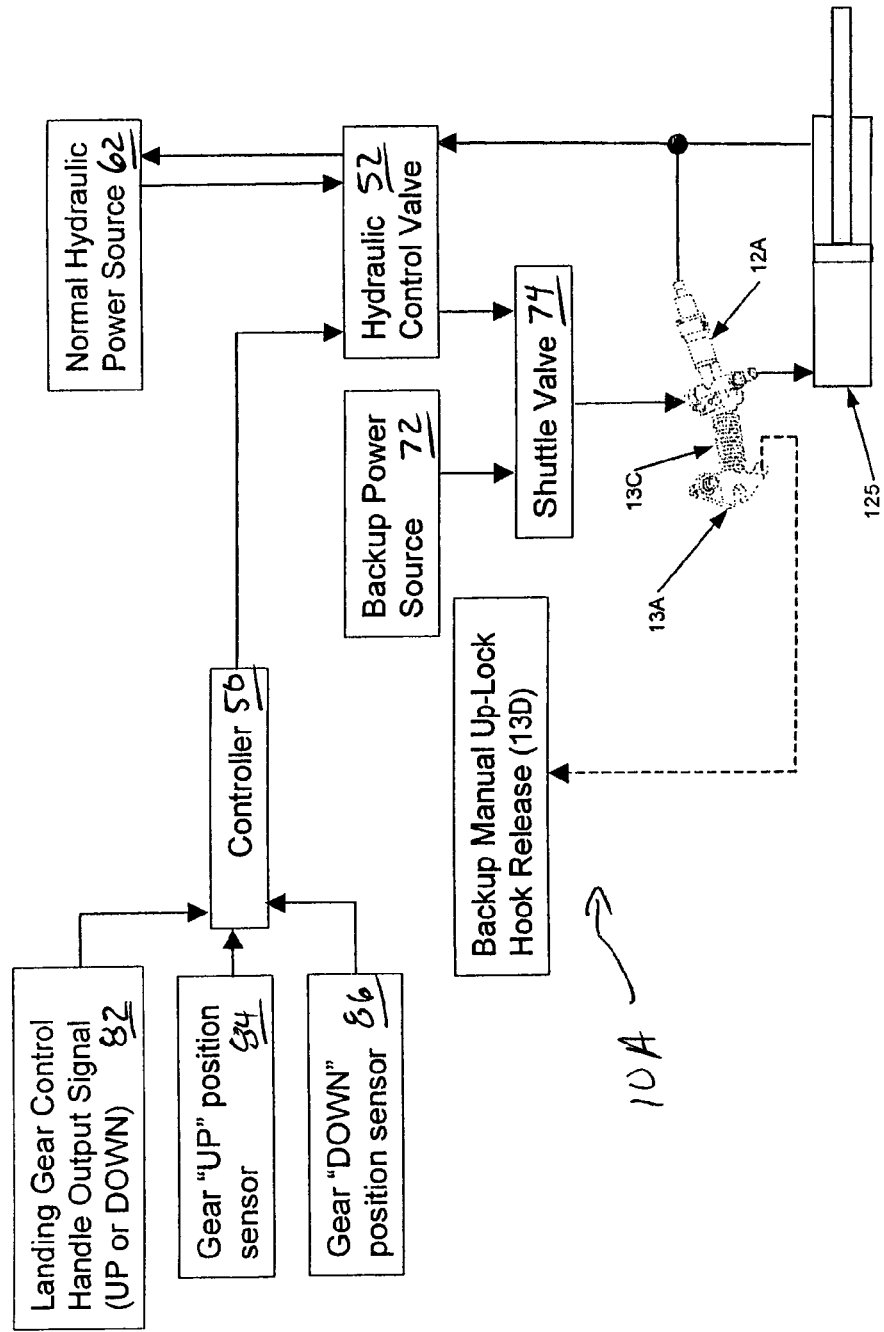
FIG. 1 is a schematic of a prior art mechanical landing gear up-lock system.
Figure 3:
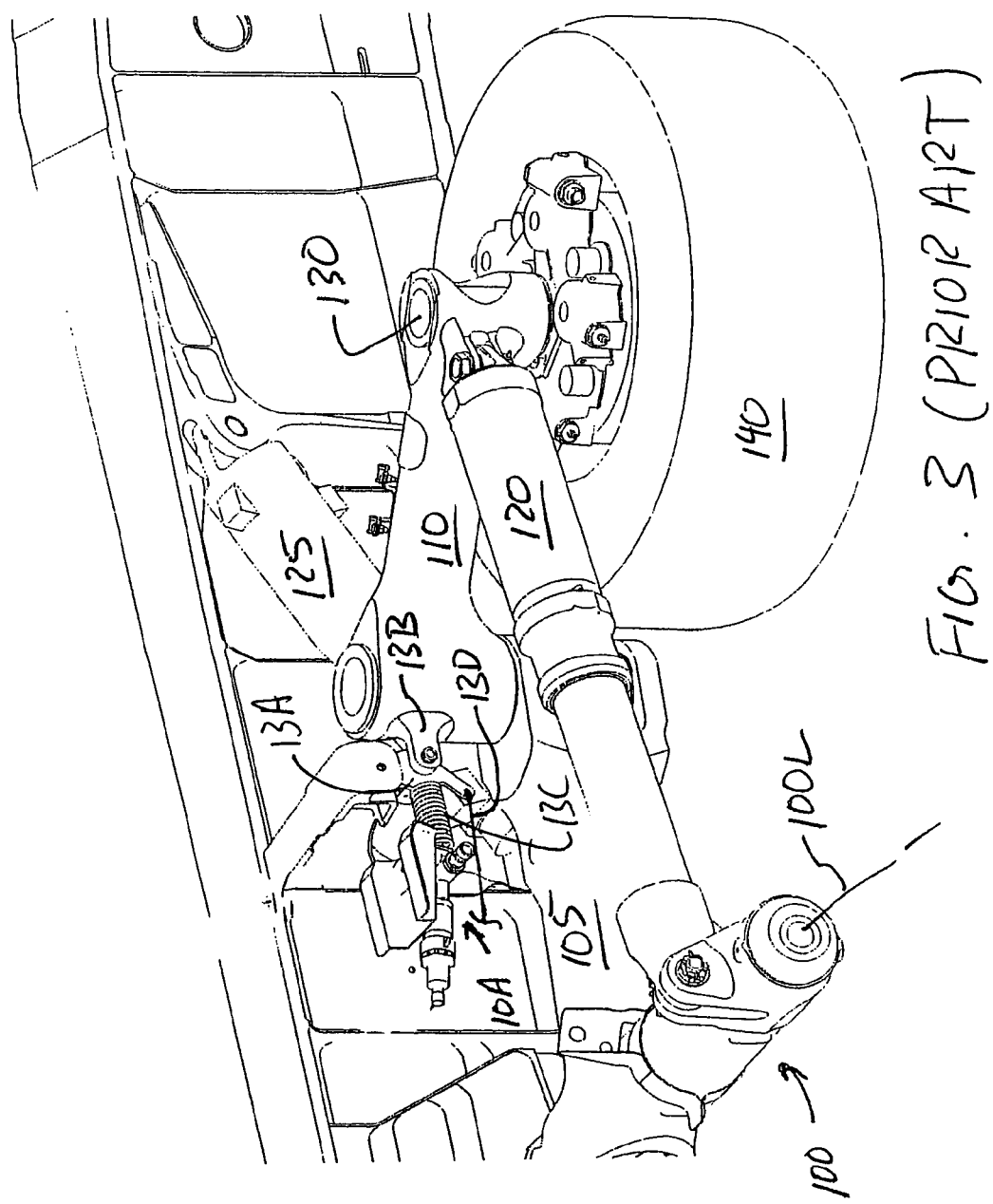
FIG. 3 is a perspective view of a prior art mechanical landing gear up-lock system with the landing gear in the retracted position.
Figure 4:
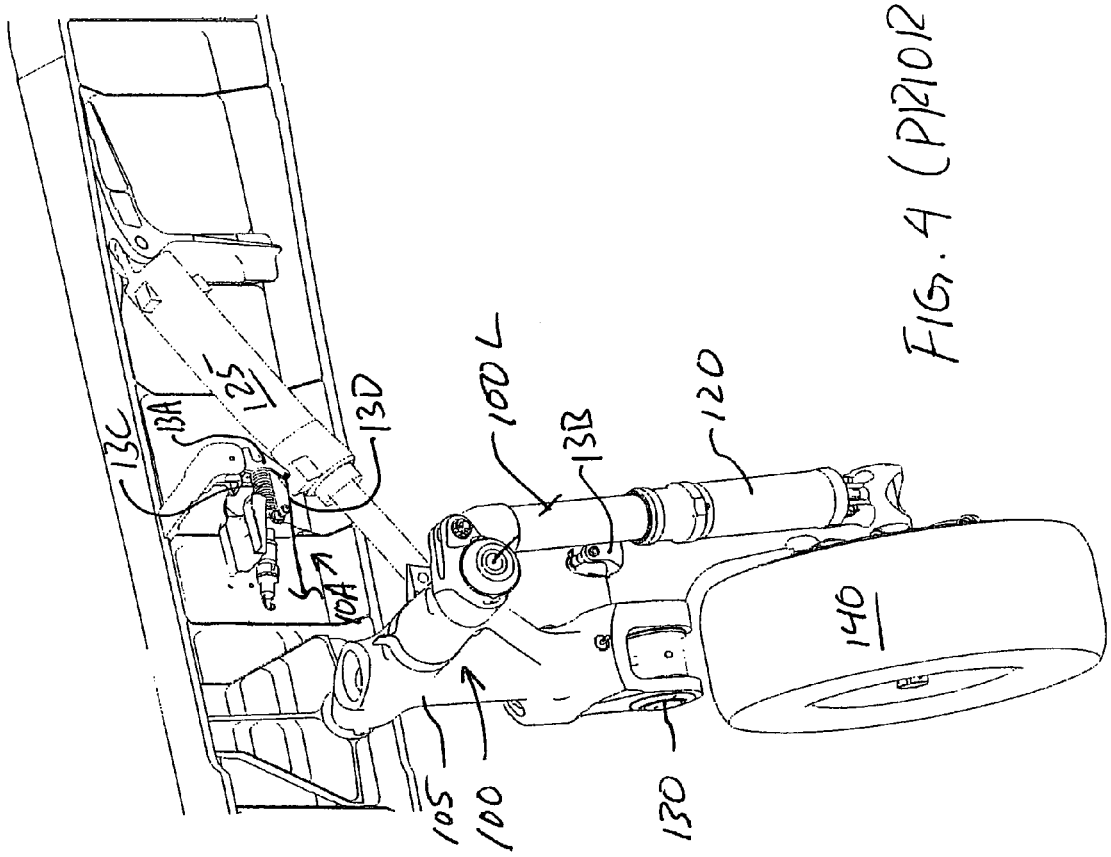
FIG. 4 is a perspective view of a prior art mechanical landing gear up-lock system with the landing gear in the extended position.

FIGS. 1, 3 and 4 illustrate a typical prior art landing gear up-lock mechanism 10A. Landing gear up-lock mechanism 10A is associated with a retractable main wheel landing gear assembly 100. Main wheel retractable landing gear assembly 100 is an example of a typical retractable main wheel landing gear assembly as may be found on a multi-engine passenger aircraft designed to carry between six and nineteen passengers. The skilled reader should appreciate that the general arrangement of landing gear assembly 100 may scaled down to accommodate smaller retractable landing gear equipped aircraft or scaled up to accommodate larger retractable landing gear equipped aircraft and that the magnetic landing gear up-lock mechanism described below may also be scaled for smaller or larger aircraft.

Figure 5:
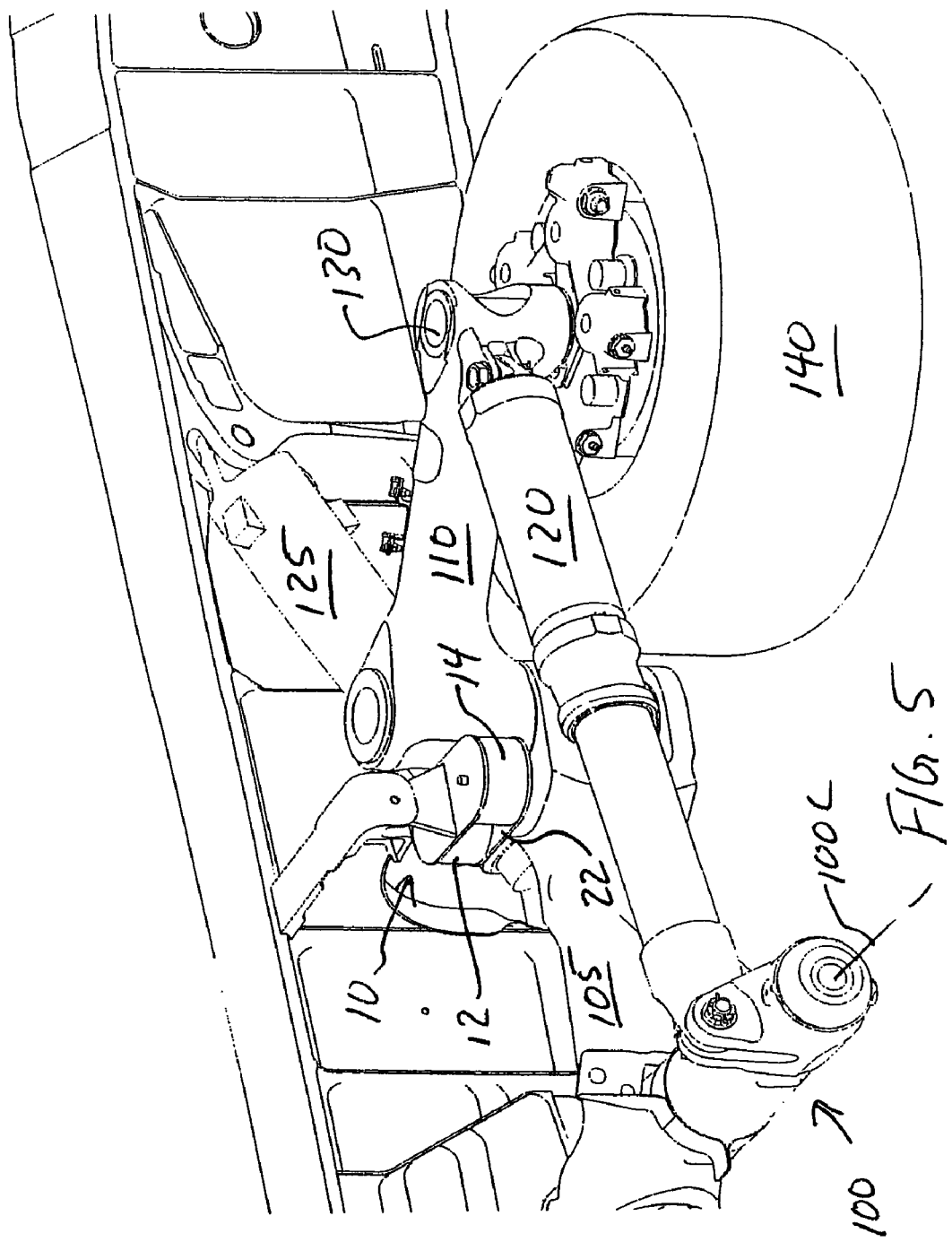
FIG. 5 is a perspective view of an electro-magnetic landing gear up-lock system with the landing gear in the retracted position.
Figure 6:
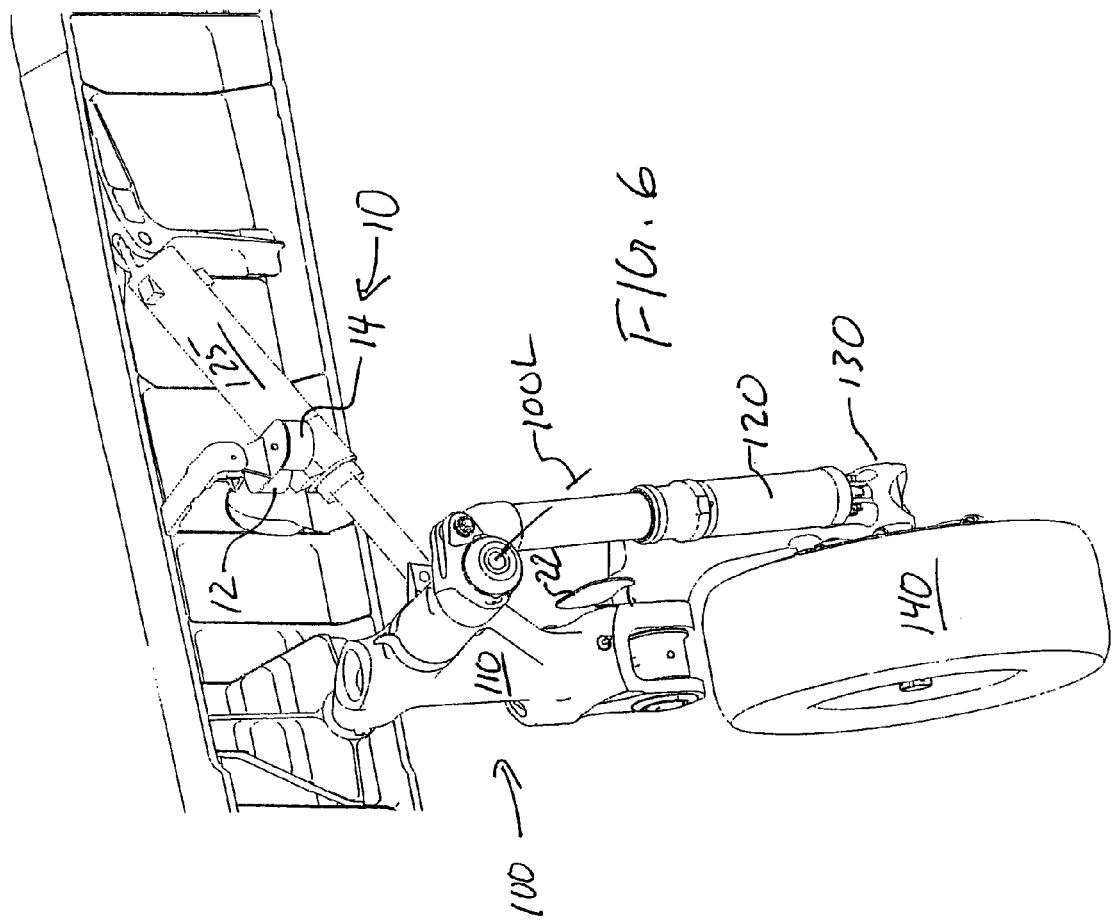
FIG. 6 is a perspective view of an electro-magnetic landing gear up-lock system with the landing gear in the extended position

Landing gear assembly 100 is shown in FIGS. 3-6. Landing gear assembly 100 is shown in a retracted position in FIGS. 3 and 5 and in an extended position in FIGS. 4 and 6. FIGS. 3 and 4 show landing gear assembly with a prior art gear up-lock mechanism 10A as will be described in greater detail below. FIGS. 5 and 6 show landing gear assembly with the present electro-magnetic gear up-lock mechanism 10 as will also be described in greater detail below. Landing gear assembly 100 is a trailing link landing gear assembly for a main wheel. Landing gear assembly 100 includes a trunion 105, a trailing link 110, a shock strut 120, a double acting hydraulic cylinder 125, a wheel axle 130 and a wheel 140. Trunion 105 is pivotably mounted to the aircraft frame for rotation around an axis of gear rotation 100L. A double acting hydraulic cylinder 125 shown in phantom in FIGS. 3-6 connects between the aircraft frame and trunion 105. When hydraulic cylinder 125 extends landing gear assembly 100 pivots about axis 100L from the retracted position shown in FIGS. 3 and 5 to the extended position shown in FIGS. 4 and 6.

As noted above, when landing gear 100 is in the retracted position shown in FIGS. 3 and 5, it is important that landing gear 100 stay in the retracted position until such time landing gear assembly 100 must be extended for landing and ground operations. In the prior art, a mechanical hook and linkage mechanism is employed to secure landing gear 100 in the up and locked position. A typical prior art system is diagrammed in FIG. 1. The prior art up-lock system 10A includes an up-lock sequence actuator assembly 12A which is connected by a mechanical linkage 13C to a landing gear up-lock hook 13A. The landing gear up-lock hook 13A engages a corresponding up-lock lug 13B fixed to a trailing link 110 as shown in FIG. 3.

Such a mechanical up-lock mechanism as diagrammed in FIGS. 1, 3 and 4, is highly effective for retaining landing gear in an up-locked position. However, care must be taken that mechanical linkage 13C and back-up hook release 13D are properly adjusted to insure proper engagement and disengagement of up-lock hook 13A. It is particularly important that up-lock hook 13A disengages up-lock lug 13B prior to the deployment of the landing gear. A significant misalignment of mechanical linkage 13C may cause up-lock hook 13A to fail to disengage prior to landing gear. A manual cable release 13D connected to up-lock hook 13A is available for manually release up-lock hook 13A if up-lock hook fails to release automatically. The manual cable release 13D must also be adjusted for proper operation. Other examples of such up-lock mechanisms may be found in U.S. Pat. No. 5,288,037 by Derrien and in US patent Publication US2003/0164421 by Collet et al.

Figure 2:
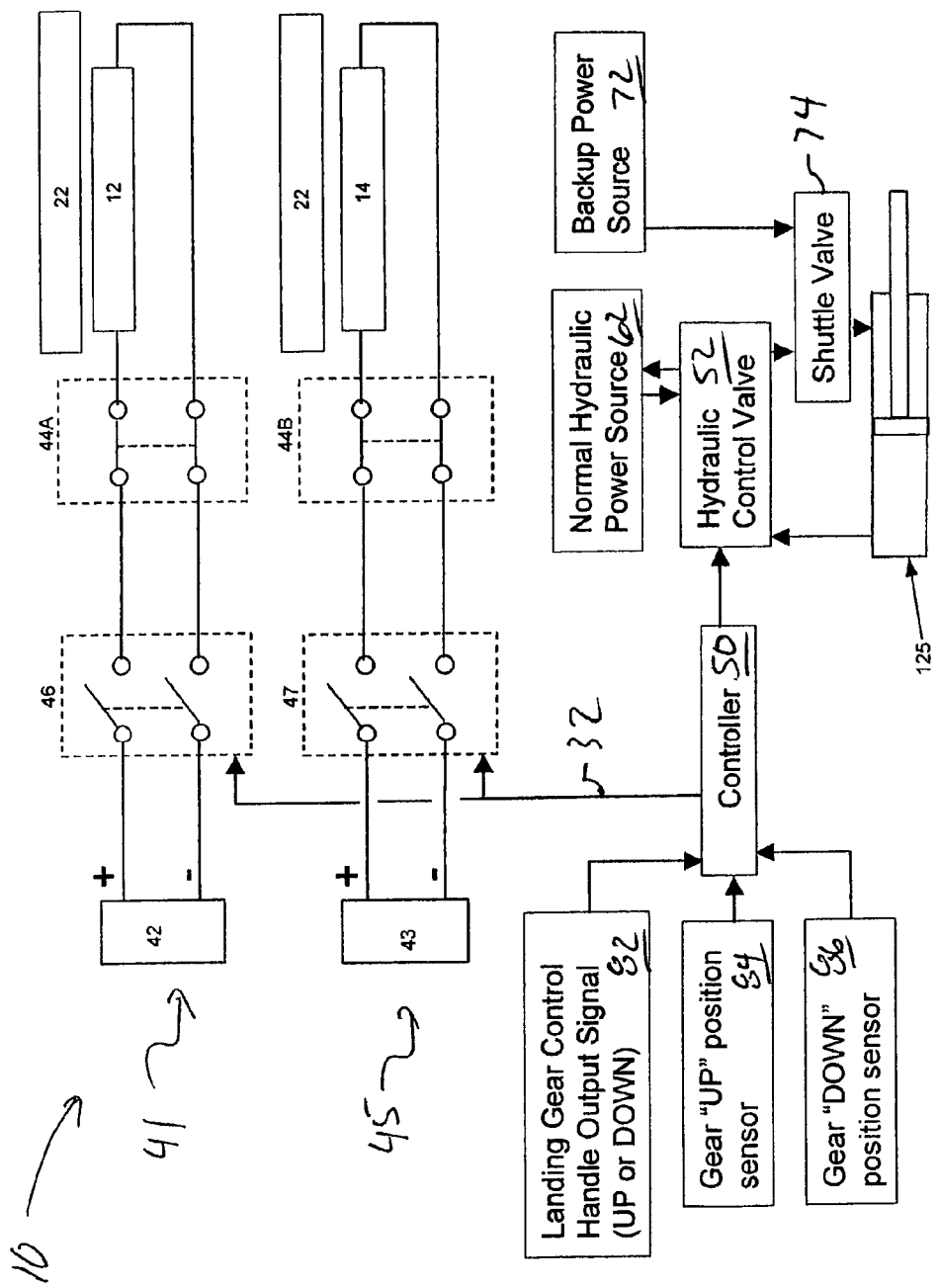
FIG. 2 is a schematic of an electro-magnetic landing gear up-lock system.

The electro-magnetic landing gear up-lock system 10 of the present application is schematically diagrammed in FIG. 2 and is illustrated in FIGS. 5 and 6.

As can be seen in FIG. 2, electro-magnetic landing gear up-lock system 10 includes electro magnets 12 and 14 and magnetic plate 22. Electro magnets 12 and 14 are mounted to the aircraft structure by bracket 16 shown in FIG. 5. Magnetic plate 22 is fixed to trunion 105.

As can be seen in FIG. 2, each electro-magnets 12 and 14 are connected to two identical energizing circuits 41 and 45 respectively. Energizing circuit 41 includes a power source 42, an override switch 44A, a circuit breaker 46 and electro-magnet 12. Energizing circuit 45 includes an override switch 44B, circuit breaker 47 and electro-magnet 14. Circuit breakers 46 and 47 are connected with the landing gear actuator system via a line 32, so that electro-magnets 12 and 14 are energized when trunion 105 is retracted and de-energized when trunion 105 is extended.

The landing gear control system for controlling hydraulic cylinder 125 associated with the landing gear is schematically represented in both FIGS. 1 and 2 and should be understood by the skilled reader as conventional and well known in the art with the exception of the interface between controller 50 and electro-magnetic landing gear up-lock system 10 shown in FIG. 2. As shown in FIG. 2, in electro-magnetic gear up-lock system 10, controller 50 of the landing gear actuator system sends a signal via line 32 to close circuit breakers 46 and 47 when landing gear control handle output signal 82 indicates an UP command. Conversely, controller 50 of the landing gear actuator system sends a signal via line 32 to open circuit breakers 46 and 47 when landing gear control handle output signal 82 indicates a DOWN command. In the unlikely event that landing gear extension is commanded to a DOWN position by landing gear control handle output signal 82 and the uplock system continues to retain the landing gear, then the pilot may use manual override switches 44A and 44B to release the gear.

In FIG. 2, a controller 50 controls the operation of electro-magnets 12 and 14 as well as a hydraulic control valve 52 which controls the extension and retraction of hydraulic cylinder 125. As can be seen in FIGS. 1 and 2, the hydraulic system includes a normal hydraulic power source 62 as well as a back up power source 72 and a shuttle valve 74 which is controlled by hydraulic control valve 52. Hydraulic control valve 52 is, in turn, controlled by controller 50. Controller 50 receives inputs from the landing gear control handle 82 which commands the gear to an up or a down position. Additionally, the system includes gear position sensors 84 and 86. Gear up position sensor 84 indicate a gear up condition when the gear is up and locked. Gear down position sensor 86 indicates a gear down condition when the gear is down and locked. When neither position sensor is activated, then the landing gear is in transition. The absence of a gear up indication from gear up position sensor 84 in combination with a landing gear up condition in landing gear control handle output 82 indicates the gear is unlocked but should be up and locked and thus should be returned to an up and locked condition. Such a condition is normal when the gear is in the process of being retracted but such a condition might also occur after a large vertical acceleration causes magnetic plate 22 to disengage from both magnets 12 and 14. This condition causes controller 50 to activate hydraulic control valve 52 and thus activate cylinder 125 to retract the landing gear so that magnetic plate 22 comes back into contact with energized magnets 12 and 14. Thus, a temporary, unwanted disengagement of electro-magnetic gear up-lock system 10 is corrected by the normal operation of the landing gear control system.

The use of two electro-magnets 12 and 14 and two associated circuits provides a reliable, redundant system. If either circuit fails, either one of electro-magnets 12 or 14 is preferably sufficiently powerful to hold trunion 105 in a retracted position. Passenger aircraft are typically approved for flight loads ranging generally between −1.5 G and +3.8 G. Both electro-magnets 12 and 14 acting in unison are preferably sized to provide enough support to hold trunion 105 when the aircraft experiences vertical accelerations occurring within the above described flight load range. A disengagement of trunion 105 from electro-magnets 12 and 14 under very high loading conditions is not a serious incident. A position sensor associated with the landing gear hydraulic system provides a signal is preferably arranged to cause the hydraulic system to retract trunion 105. This action brings magnetic plate 22 into proximity with electro-magnets 12 and 14 thus allowing electro-magnets 12 and 14 to reengage magnetic plate 22.

An electrical analog to the manual cable release 13D described above is also present in this system. Mechanical override switches 44A and 44B may be used to open both circuits for electro-magnets 12 and 14 should the system fail to disengage prior to landing gear extension. Opening mechanical override switches 44A and 44B interrupts the flow of current to electro-magnets 12 and 14 and thus causes electro-magnetic landing gear up-lock system 10 to disengage.

Electro-magnetic landing gear up-lock system 10 provides several important advantages. Even with the presence of relatively heavy electro-magnets, the total weight of the gear up-lock system may be reduced by 5 to 10 lbs. per aircraft for an aircraft under 15000 lbs. maximum takeoff weight. Electro-magnetic landing gear up-lock system 10 is simpler, has fewer parts and is therefore much easier to fabricate and install than a conventional mechanical up-lock system. Accordingly, electro-magnetic landing gear up-lock system 10 fulfills the above stated need for an effective landing gear up-lock system which is simple and which does not require the precise alignment and adjustment of mechanical components. Electro-magnetic landing gear up-lock system 10 significantly reduces flight crew workload in the event of a failure in the normal gear extension system.

It is to be understood that while certain forms of this invention have been illustrated and described, it is not limited thereto, except in so far as such limitations are included in the following claims and allowable equivalents thereof.

The invention claimed is:

1. An aircraft retractable landing gear assembly comprising:
   (a) a landing gear trunion supporting a wheel assembly pivotally mounted to the aircraft for pivoting about a trunion axis for movement between a retracted position and an extended position, the landing gear trunion including a magnetically responsive metal portion that is spaced away from the trunion axis;
   (b) a double acting hydraulically powered hydraulic cylinder connected between the aircraft structure and the trunion for extending the gear from its retracted position to its extended position;
   (c) an electro-magnet mounted to the aircraft structure positioned for engaging alignment with the magnetically responsive metal portion of the trunion when the trunion is in the retracted position, the electro-magnet switchable between an energized state and a non-energized state, whereby switching the electro-magnet to the energized state when the trunion is in the retracted position holds the landing gear in the retracted position.

2. The landing gear assembly of claim 1 wherein; the electro-magnet has a holding force sufficient to hold the landing gear in the retracted position when the aircraft undergoes an upward acceleration within a predetermined range of flight conditions.

3. The landing gear assembly of claim 1 wherein; the electro-magnet includes two separately switched electro-magnets.

4. The landing gear assembly of claim 1 wherein; the electro-magnet includes two separately switched electro-magnets and wherein each one of the two electro-magnets has a holding force sufficient to hold the landing gear in the retracted position when the aircraft undergoes a 3.8 g upward acceleration.

5. An aircraft landing gear up-lock system for retaining a landing gear assembly which is pivotably mounted to an aircraft structure in a retracted position, comprising:
   at least one electro-magnet mounted to the aircraft structure positioned for engaging alignment with a magnetically responsive metal portion mounted to the landing gear, a switch for switching the electro-magnet between an energized state and a non-energized state, whereby switching the electro-magnet to the energized state when the landing gear is in the retracted position holds the landing gear in the retracted position and whereby switching the electro-magnet to the non-energized state releases the landing gear for extension.

6. The aircraft landing gear up-lock system of claim 5 wherein;
   the switch for switching the electro-magnet between the energized state and the non-energized states is operatively connected to a controller which is connected to a landing gear control handle which produces an output signal indicating either a gear up or a gear down selection, the controller activating the switch to energize the electro-magnet when the gear control handle produces a gear-up signal.

7. The landing gear assembly of claim 5 wherein; the electro-magnet has a holding force sufficient to hold the landing gear in the retracted position when the aircraft undergoes an upward acceleration within a predetermined range of flight conditions.

8. The landing gear assembly of claim 5 wherein; the electro-magnet includes two separately switched electro-magnets.

9. The landing gear assembly of claim 5 wherein; the electro-magnet includes two separately switched electro-magnets and wherein each one of the two electro-magnets has a holding force sufficient to hold the landing gear in the retracted position when the aircraft undergoes a 3.8 g upward acceleration.

* * * * *